United States Patent
Murphy

(10) Patent No.: US 7,195,231 B2
(45) Date of Patent: Mar. 27, 2007

(54) SPARE TIRE SECURITY SYSTEM

(75) Inventor: Richard F. Murphy, Oak Lawn, IL (US)

(73) Assignee: Phy-Con, Inc., Oak Lawn, IL (US)

( * ) Notice: Subject to any disclaimer, the term of this patent is extended or adjusted under 35 U.S.C. 154(b) by 0 days.

(21) Appl. No.: 11/143,263

(22) Filed: Jun. 3, 2005

(65) Prior Publication Data

US 2006/0284152 A1    Dec. 21, 2006

(51) Int. Cl.
*B66D 1/00* (2006.01)

(52) U.S. Cl. .................. 254/323; 414/463; 224/42.21; 224/42.25

(58) Field of Classification Search ................ 254/323; 414/463, 466, 462; 224/42.21, 42.25
See application file for complete search history.

(56) References Cited

U.S. PATENT DOCUMENTS

| | | | | |
|---|---|---|---|---|
| 3,918,599 A | * | 11/1975 | Porter | 414/466 |
| 4,282,995 A | * | 8/1981 | Austin | 224/42.23 |
| 5,487,288 A | * | 1/1996 | Frantz | 70/259 |
| 5,823,413 A | * | 10/1998 | Seltz | 224/402 |
| 6,003,922 A | * | 12/1999 | Giesey et al. | 296/37.3 |
| D427,886 S | * | 7/2000 | Markegard et al. | D8/341 |
| 6,082,803 A | * | 7/2000 | Klueger | 296/37.2 |
| 6,092,790 A | * | 7/2000 | Dobmeier et al. | 254/323 |
| 6,427,885 B1 | * | 8/2002 | Dexel | 224/42.24 |
| 6,648,577 B2 | * | 11/2003 | Obriot | 414/463 |
| 6,749,094 B1 | * | 6/2004 | Dexel | 224/42.24 |
| 2006/0104768 A1 | * | 5/2006 | Park et al. | 414/463 |

* cited by examiner

*Primary Examiner*—Emmanuel M Marcelo
(74) *Attorney, Agent, or Firm*—McDermott Will & Emery

(57) ABSTRACT

Disclosed is a security device to protect the spare tire on a vehicle from possible theft. The spare tire, especially in sport utility vehicles, is located on the rear underside of the vehicle and is secured by a cable and yoke. The security device comprises a plate or disk which is attached to the spare tire rim and prevents unauthorized access to cable and yoke, thereby minimizing the possibility of theft.

21 Claims, 2 Drawing Sheets

SPARE TIRE SECURITY SYSTEM

BACKGROUND OF THE INVENTION

In most sport utility vehicles (SUV), the spare tire is located on the rear underside of the vehicle. A winch type mechanism attached to a cable and yoke is used to secure the spare tire to the underside of the vehicle and permit ready access to the tire when needed. However, a thief can easily cut the steel cable attached to the yoke and remove the spare tire. Thus, the owner of the SUV will have the expense of replacing the entire winch mechanism as well as the spare tire.

BRIEF DESCRIPTION OF THE DRAWING

The present invention will become more apparent from the following detailed description taken in conjunction with the accompanying drawings, in which.

DETAILED DESCRIPTION OF THE INVENTION

Figure 1:
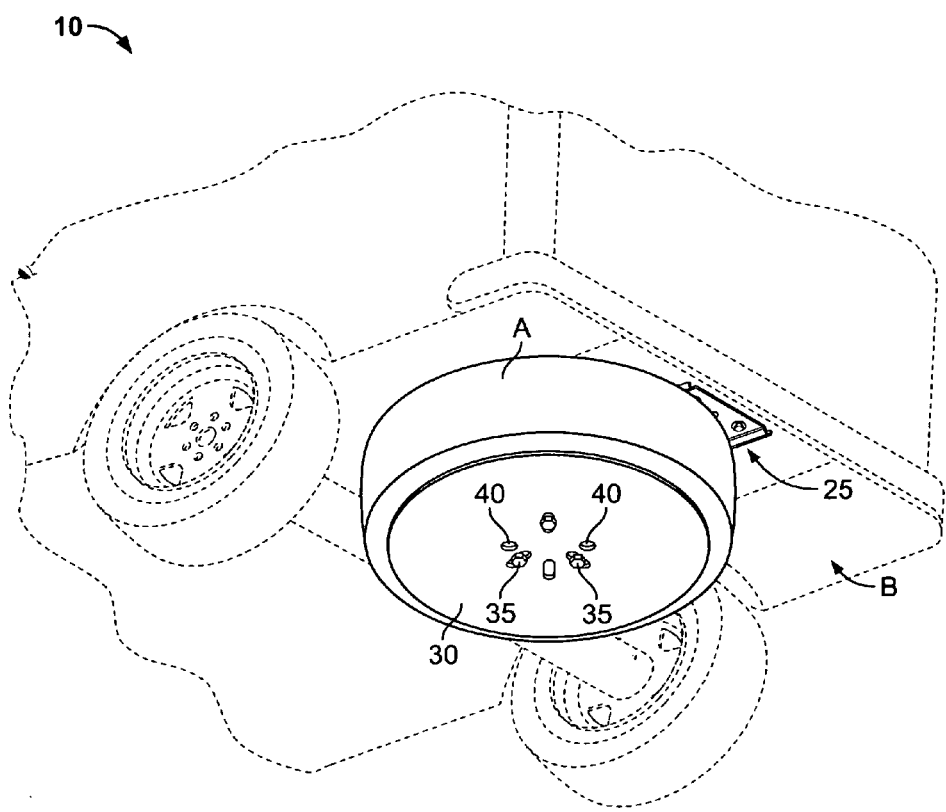
FIG. 1 is a perspective view of a security system used to secure a spare tire to underside of a vehicle, showing the system in an installed position.
Figure 2:
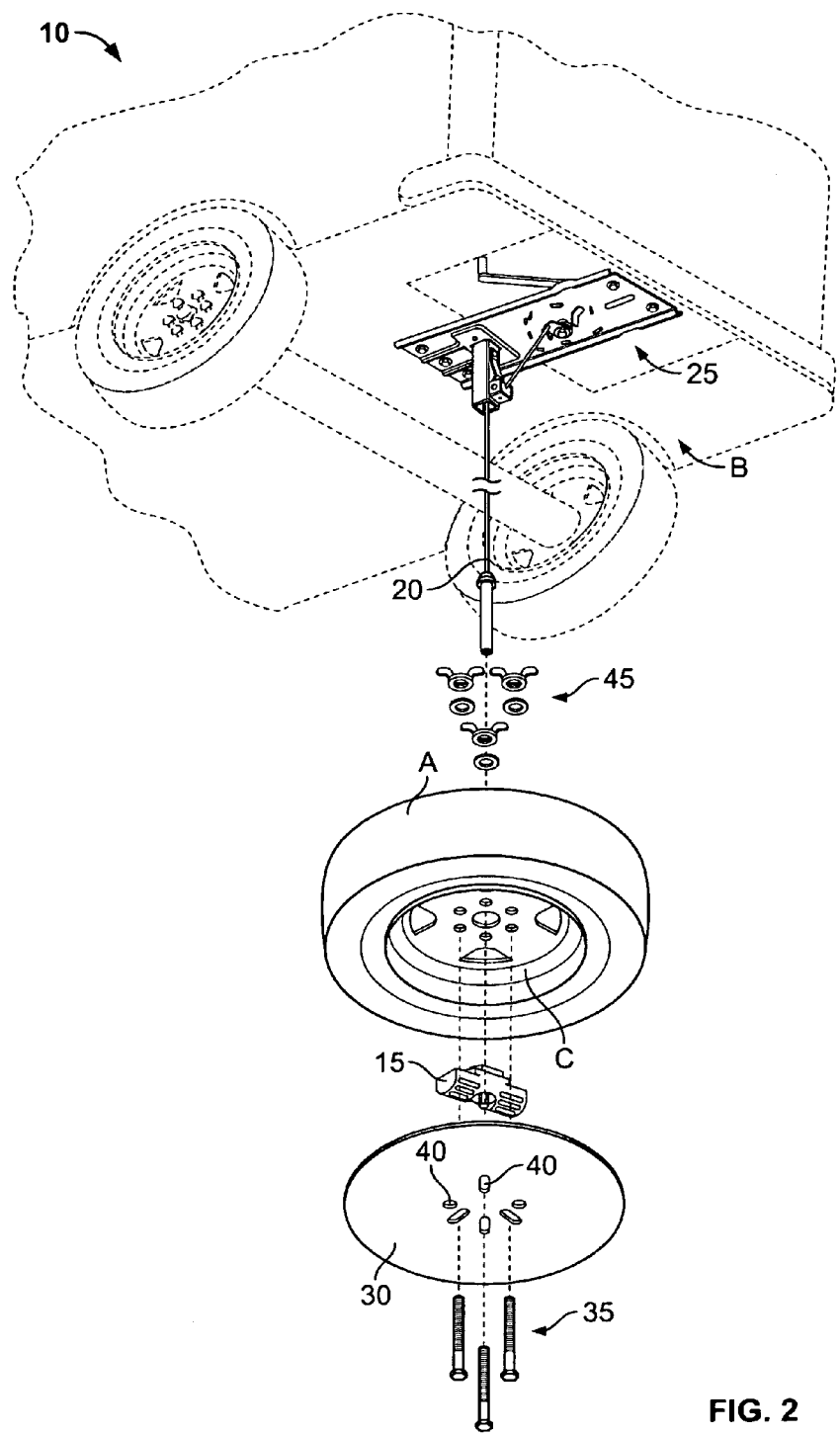
FIG. 2 is a perspective view of the security system in an un-installed position, thereby preventing access to the cable and yoke.

Referring to FIGS. 1 and 2, the spare tire security system 10 comprises a yoke 15 and cable 20 which secures the spare tire A to the underside of the vehicle B by means of the winch type mechanism 25. The security device 10 further comprises a plate or disk 30 with a plurality of bolts 35 extending through plate holes 40. The plate 30 is attached to an outer surface of the spare tire A and covers the rim C by means of suitable nuts 45, such as wing nuts (as shown). Hence the security device 10 prevents unauthorized access to the yoke 15 and cable 20, thereby minimizing the possibility of theft.

What is claimed is:

1. A security device for securing a spare tire to the underside of a vehicle, the security device comprising:
   a spare tire;
   a winch mechanism including a cable and a yoke;
   a circular securing plate; and,
   wherein in an installed position, the winch mechanism couples the spare tire to the underside of the vehicle and the securing plate resides against an outer surface of the spare tire to prevent access to the cable and the yoke.

2. The security device of claim 1, wherein the securing plate has an opening that receives a bolt to secure the plate against the spare tire.

3. The security device of claim 2, wherein a nut is connected to the bolt to secure the plate against an outer surface of the spare tire.

4. The security device of claim 3, wherein the nut resides between an inner surface of the spare tire and the underside of the vehicle in the installed position.

5. The security device of claim 1, wherein the yoke resides between the spare tire and the plate.

6. The security device of claim 1, wherein the securing plate extends beyond an inner periphery of the spare tire in the installed position.

7. The security device of claim 1, wherein the securing plate resides inward of an outer periphery of the spare tire in the installed position.

8. The security device of claim 1, further comprising a plurality of bolts and nuts, wherein each bolt extends through an opening in both the plate and the spare tire and wherein each bolt connects with a nut to secure the plate against the spare tire.

9. A security device for securing a spare tire to the underside of a vehicle, the security device comprising:
   a spare tire having a rim;
   a winch mechanism including a cable and a yoke, wherein the winch mechanism allows for detachable coupling of the spare tire to the underside of the vehicle;
   a securing plate residing against an outer surface of the spare tire, wherein the plate entirely covers both the rim and an inner periphery of the spare tire to prevent access to the cable and the yoke.

10. The security device of claim 9, further comprising a plurality of bolts and nuts, wherein each bolt extends through an opening in both the plate and the spare tire and wherein each bolt connects with a nut to secure the plate against the spare tire.

11. The security device of claim 10, wherein the nuts reside between an inner surface of the spare tire and the underside of the vehicle.

12. The security device of claim 9, wherein the yoke resides between the spare tire and the plate.

13. The security device of claim 9, wherein the securing plate resides inward of an outer periphery of the spare tire.

14. The security device of claim 13, wherein the security plate has a circular outer periphery and extends beyond the inner periphery of the spare tire.

15. A security device for securing a spare tire to the underside of a vehicle, the security device comprising:
   a spare tire having a rim, the spare tire positioned against the underside of the vehicle;
   a circular securing plate residing against an outer surface of the spare tire and covering the rim, wherein the plate has an outer periphery that extends beyond an inner periphery of the spare tire.

16. The security device of claim 15, further comprising a winch mechanism including a cable and a yoke, wherein the winch mechanism allows for detachable coupling of the spare tire to the underside of the vehicle, and wherein the plate prevents access to the cable and the yoke.

17. The security device of claim 16, wherein the yoke resides between the spare tire and the plate.

18. The security device of claim 15, further comprising a plurality of bolts and nuts, wherein each bolt extends through an opening in both the plate and the rim, and wherein each bolt connects with a nut to secure the plate against the spare tire.

19. The security device of claim 18, wherein the nuts reside between an inner surface of the rim and the underside of the vehicle.

20. The security device of claim 18, wherein the plate includes three openings that are spaced approximately 120 degrees apart.

21. The security device of claim 15, wherein the outer periphery of the securing plate resides inward of an outer periphery of the spare tire.

* * * * *